United States Patent [19]

Ruff

[11] Patent Number: 4,917,548
[45] Date of Patent: Apr. 17, 1990

[54] PATTERN DRILLING MACHINE FOR SECURING ROOFING INSULATION

[76] Inventor: Robert W. Ruff, 5210 Park St., Hudsonville, Mich. 49426

[21] Appl. No.: 177,095

[22] Filed: Apr. 4, 1988

[51] Int. Cl.⁴ .................. B23B 41/00; B23B 47/00
[52] U.S. Cl. ............................ 408/1 R; 408/42; 408/77; 408/111; 408/112; 408/136; 408/712
[58] Field of Search ............ 408/1 R, 3, 31, 42, 408/49, 50, 52, 53, 72 R, 77, 78, 87, 98, 99, 100, 110, 111, 112, 113, 136, 234, 712

[56] References Cited

U.S. PATENT DOCUMENTS

| | | | |
|---|---|---|---|
| 1,299,318 | 4/1919 | Fogleman | 408/77 |
| 1,533,381 | 4/1925 | Burton | 408/77 |
| 1,927,006 | 9/1933 | Guibert et al. | 408/136 |
| 2,825,372 | 3/1958 | Talboys | 408/77 |
| 4,059,162 | 11/1977 | Zbinder et al. | 408/53 |
| 4,674,925 | 6/1987 | Thornton et al. | 408/1 R |
| 4,765,785 | 8/1988 | Calzone | 408/77 |

FOREIGN PATENT DOCUMENTS

| | | | |
|---|---|---|---|
| 45374 | 6/1910 | Fed. Rep. of Germany | 408/77 |
| 88529 | 4/1987 | Japan | 408/31 |
| 136303 | 6/1987 | Japan | 408/77 |
| 7804825 | 12/1979 | Sweden | 408/234 |
| 1042904 | 9/1983 | U.S.S.R. | 408/31 |
| 1575902 | 10/1980 | United Kingdom | 408/50 |

Primary Examiner—Daniel Howell
Attorney, Agent, or Firm—Waters, Morse & Harrington

[57] ABSTRACT

A lightweight machine for drilling a pattern of fastening holes in panels of installed roofing insulation is movably supported on rollers that rest on the panels without substantially deforming them. The machine is maneuvered by a handle, and vertical movement of the handle lowers a template carrying a gang of drills. The drills proceed through a central opening in the frame of the machine to engage the panels in the sub-roof structure on which they have been installed.

3 Claims, 5 Drawing Sheets

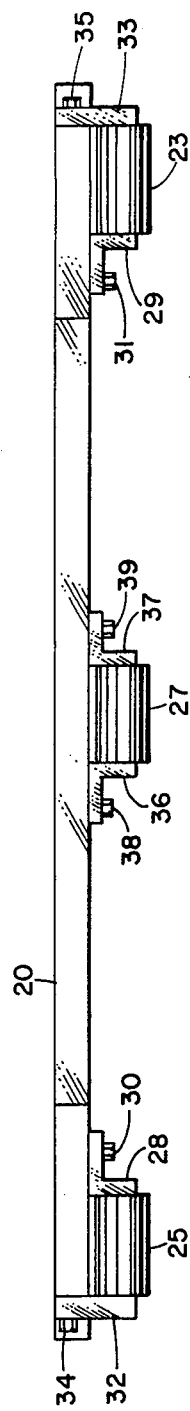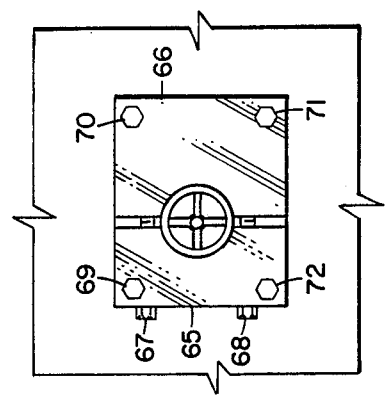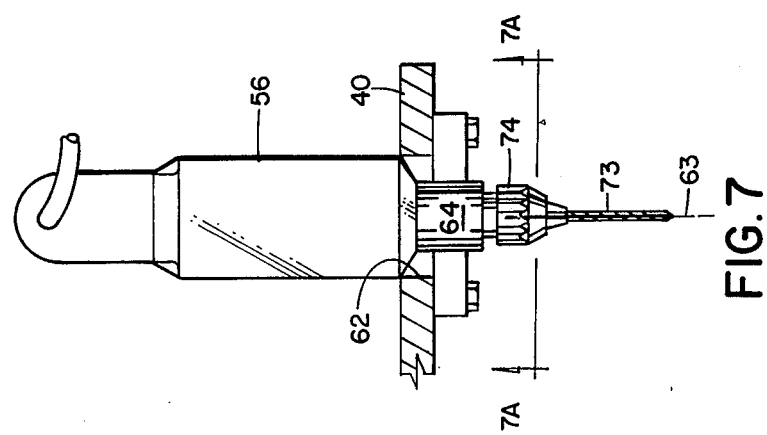

PATTERN DRILLING MACHINE FOR SECURING ROOFING INSULATION

BACKGROUND OF THE INVENTION

The usual construction of flat end low-sloped roofs involves laying down a series of layers, or laminations, of various materials in sequence. A sub-roof structure providing the necessary strength is first put in place. This may be in the form of poured or pre-cast concrete slabs, or a combination of wood and possible plywood that presents a solid surface on which the rest of the laminations are deposited. The first of these is usually 4 ft.×8 ft. insulation panels of conventional foamed material. These panels are fairly soft, and will not tolerate high localized pressure without significant deformation. Anything tending to compress these panels substantially will alter their insulation characteristics, and interfere with the planar uniformity of the completed roof. The insulation panels must be secured in place. This is usually done by drilling a pattern of holes through the panels, and into the sub-roof structure to receive standard fastenings. Each panel will probably be secured at about 16 points, which obviously presents a cost problem. This is particularly true when the sub-roof is some form of concrete, and thus presents considerable resistance to the drilling process. The usual practice has been to run these holes in with hand-held drills, as the softness of the insulation panels has always been thought to preclude the use of machinery. The panels will withstand the pressure per square inch represented by a man walking around on soft-soled shoes, but not the heavier concentrations of pressure that normally are associated with portable machinery. The situation prior to the present invention has thus involved the laborious drilling of all of these holes in each 4 ft.×8 ft. panel, on a one-by-one basis.

Pattern drilling machines are well known in factories and machine shops. They are sometimes referred to as template drills, and most often involve a plate laid out with a pattern of holes associated with a particular job, and drilling spindles mounted at each of these locations. The usual arrangement is a common drive for all of these spindles, either through gearing or with an arrangement of belts. It has apparently occurred to no one to utilize this principle in the securing of insulation for flat roofs, because of the difficulty of picking such machines up, and depositing them on a roof under construction. This is compounded by the obvious problem that the weight of such machines would create as it moved across the soft insulation panels. The present invention provides a machine that makes the gang drilling of holes in the insulation panels a practical procedure.

SUMMARY OF THE INVENTION

This invention provides a light weight roller-mounted machine that can be handled in the manner of a lawnmower, and which can be moved over the foam insulation panels without substantially deforming them. Vertical movement of the handle of the machine lowers a template carrying a gang of self-powered drills so that the drill bits traverse a central opening in a rectangular frame plate to engage the foam panels and then the sub-roof structure underneath to provide holes for receiving standard fastenings. The drills are arranged in a particular pattern that assures that the panels are secured at uniformly spaced points over the area of the panel. Raising the handle elevates the drills out of engagement to permit the machine to be moved on its rollers over the panel surface to the site of the next pattern to be drilled. The operator is guided in the placement of the next pattern by the relationship of the rectangular configuration of the machine to the pattern of holes that is produced. Preferably, each 4 ft.×8 ft. panel is drilled with two such patterns, separated along the length of the insulation panels.

DESCRIPTION OF THE DRAWINGS

FIG. 6 is a side elevation of the frame plate shown in FIG. 3.

FIG. 7 is a section on an enlarged scale of the plane 7—7 of FIG. 4.

FIG. 7A is a view as indicated on FIG. 7.

DESCRIPTION OF THE PREFERRED EMBODIMENT

Figure 1:
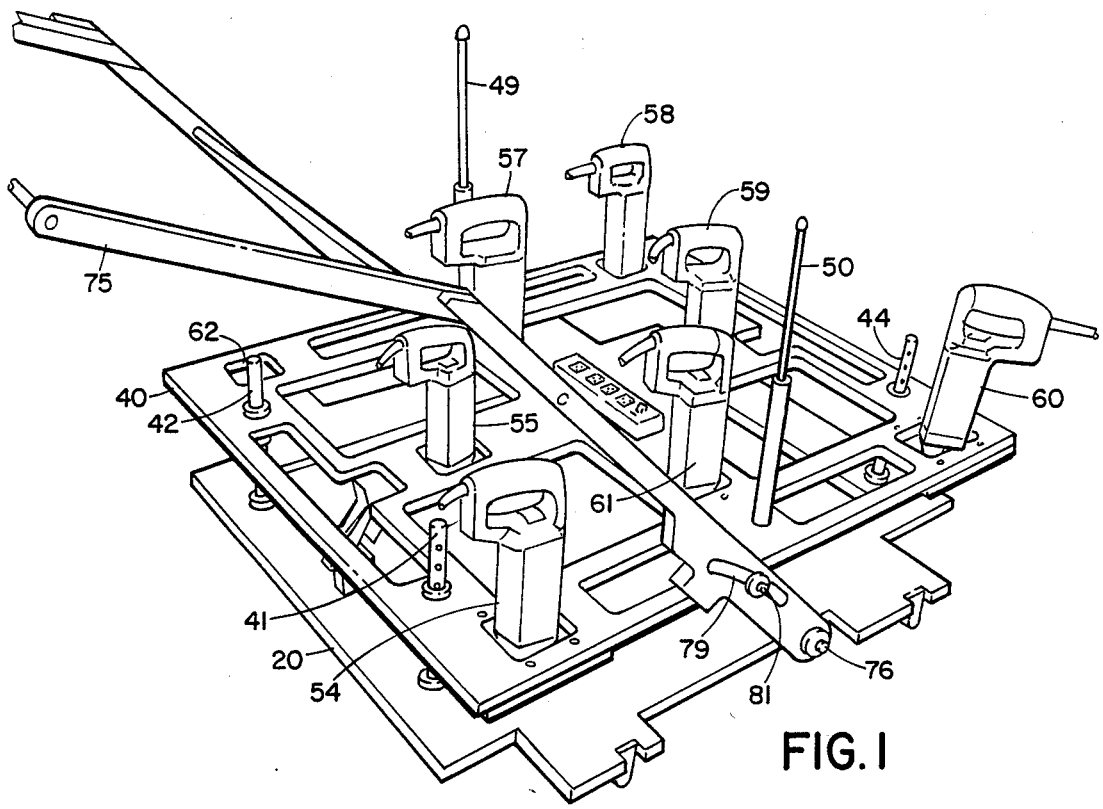
FIG. 1 is a perspective view of the preferred form of the drilling machine.
Figure 3:
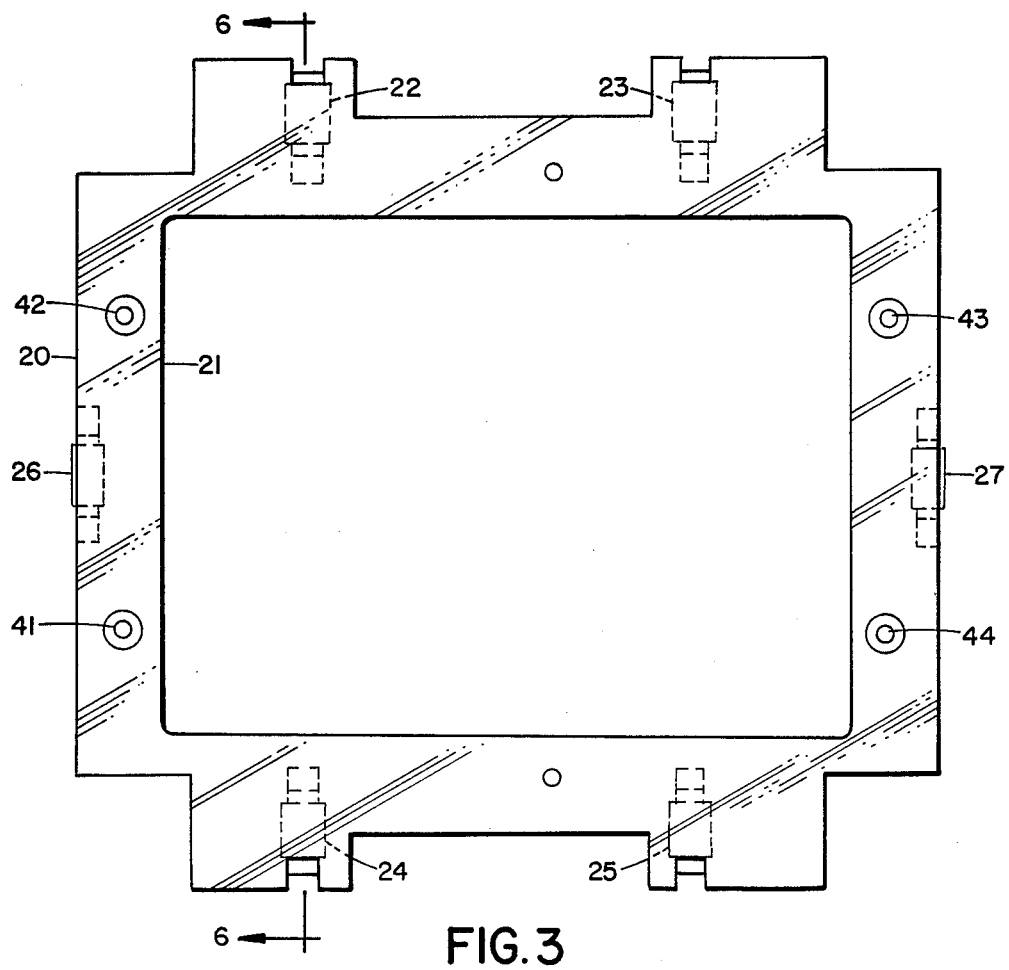
FIG. 3 is a plan view of the frame plate of the machine.

The machine illustrated in the drawings includes a rectangular frame plate 20 defining a central opening 21. The frame is carried on the surface of the insulation panels by the rollers 22-27. To distribute the weight of the machine over a relatively large area of the soft insulation material, the axial length of the rollers should be greater than the diameter. Referring to FIG. 6, the side rollers 22-25 are carried between angle brackets as shown at 28 and 29 secured to the bottom of the frame 20 by bolts as shown at 30 and 31, and the short vertical arms 32 and 33 secured by the bolts 34 and 35 in threaded engagement with the edges of the frame 20. The central rollers 26 and 27 are carried between similar angle brackets as shown at 36 and 37 bolted in place as shown at 38 and 39. All of the rollers have the usual shafts (not shown) in the brackets and in the vertical support members. This arrangement of a number of distributed rollers of these proportions, and the manner of supporting them, minimizes the height and weight requirements of the lower structure while providing the weight distribution necessary for the unit to function well on the panels of foamed material.

Figure 2:
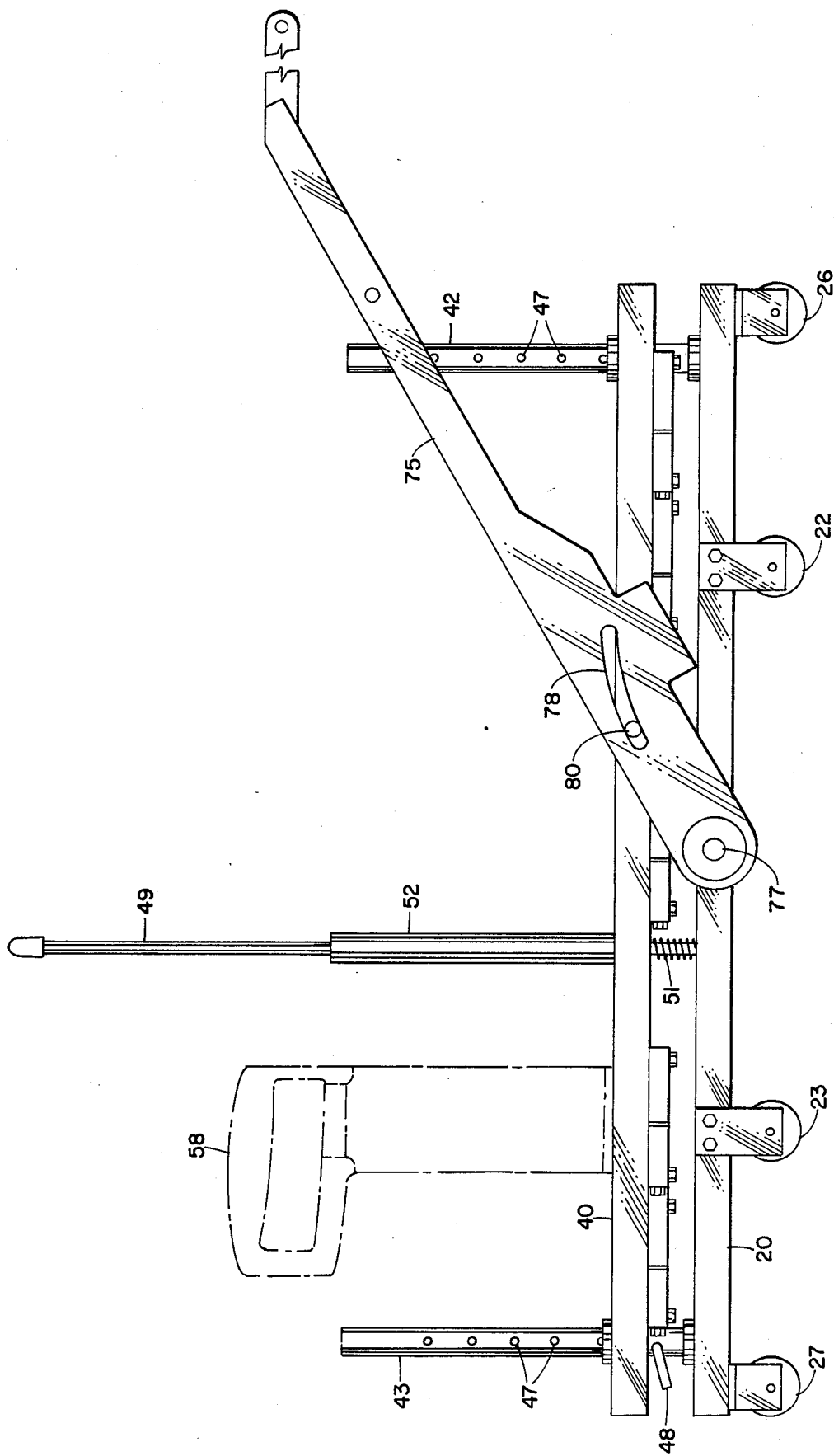
FIG. 2 is a side elevation of the machine shown in FIG. 1.
Figure 5:
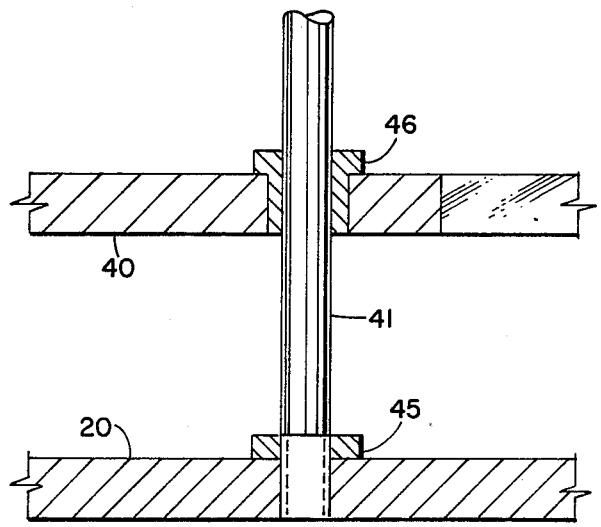
FIG. 5 is a section on an enlarged scale on the plane 5—5 of FIG. 4.
Figure 10:
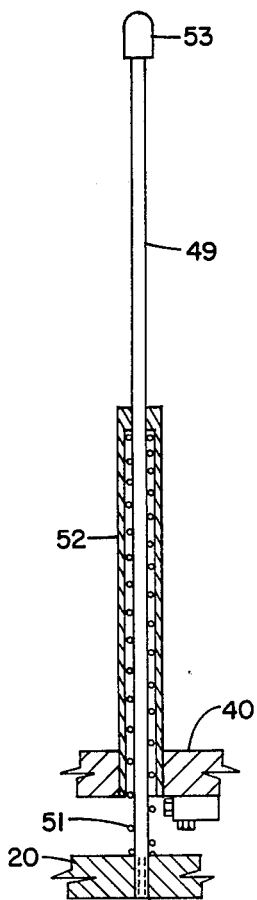
FIG. 10 is a section on an enlarged scale taken through the axis of one of the balance spring units biasing the template and its drills to the elevated position.

The rectangular frame provides a platform supporting the structure associated with the vertically moveable template 40. A set of four guideposts 41-44 is arranged perpendicular to the frame 20, and mounted as shown in FIG. 5. The lower extremity of these posts is in threaded engagement with the frame 20, and locked in this relationship by nuts as shown at 45. Appropriate holes in the template 40 receive bearing sleeves as shown at 46, which are either press-fitted or in threaded engagement with the template. These sleeves are in sliding engagement with the guideposts, and establish the path of movement of the template 40 toward and away from the frame 20, and at all times parallel to it. The guideposts are each provided with transverse holes as shown at 47 in FIG. 2 to receive an "L"-shaped crosspin 48 which can be inserted as desired to establish a limit stop to the downward movement of the template. This movement is counter-balanced by the structure shown in FIG. 10. The vertical rods shown at 49 and 50 in FIG. 1 are each secured to the frame, either through threaded engagement, or by a press fit. A coiled compression spring surrounds each rod as shown at 51, which is shielded by the tube 52 either threaded or press-fitted into the template 40. The top of the tubes 52 is closed into sliding engagement around the rods, so that the upper extremity of the tubes forms a base against which the action of the spring can be applied. Since the tube is fixed with respect to the template, and the lower extremity of the spring bears against the frame, the effect of the spring force is to neutralize the weight of the template and its components. Caps as shown at 53 in FIG. 10, are applied to blunt the ends of the rods 49.

Figure 4:
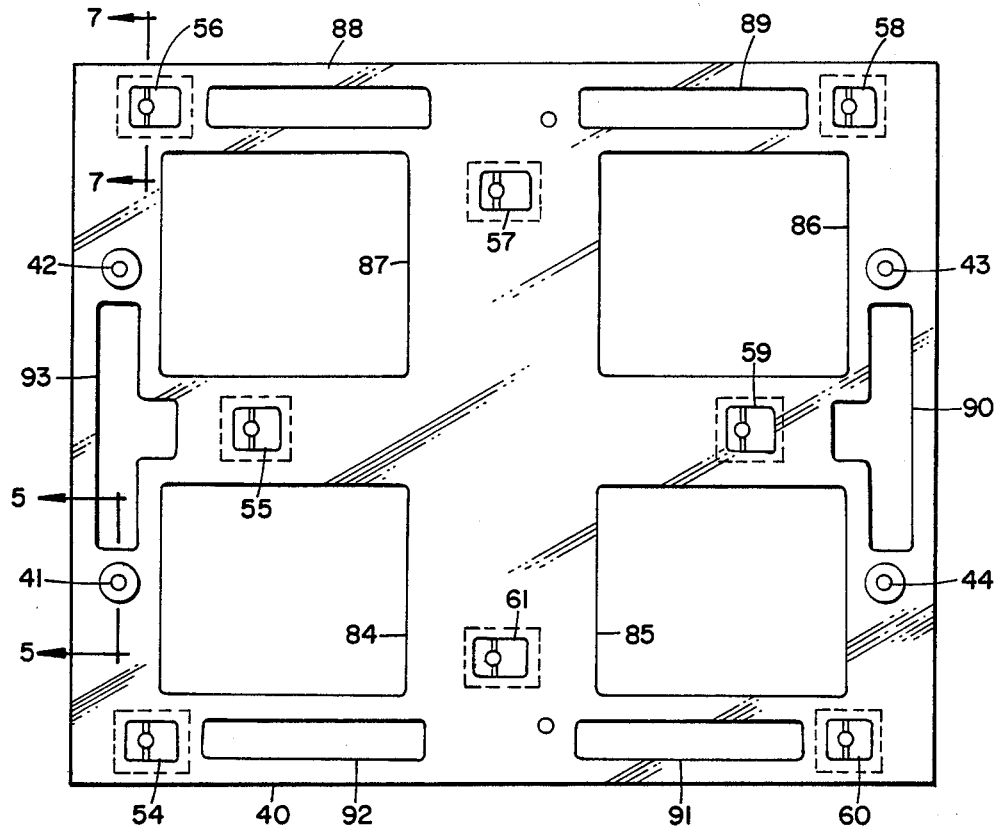
FIG. 4 is a plan view of the template that carries the drills establishing the particular pattern of holes.

A series of pistol drills 54-61 is mounted in a prescribed pattern on the template 40 as shown in FIG. 4. The usual electrical wiring and circuit controls for the drills are omitted for clarity. In FIG. 1, the drill 56 has been omitted to illustrate the mounting opening in which the drill units are received. At each drill location, a clearance hole 62 is provided as shown at FIG. 7. The center of this hole is close to the drilling axis 63. The housing of standard drills of the type used with this machine have cylindrical portions indicated at 64, and these are received between the clamping plates shown at 65 and 66 in FIG. 7A. Tightening the clamping bolts 67 and 68 grips the drills securely, so that the mounting bolts 69-72 in threaded engagement with the template can secure the drills firmly in position. The drill bits indicated at 73 will thus be accurately located in the desired pattern. During the downward movement of the template, the drill bits, and usually at least portions of the drill chucks 74, will move downward through the opening 21 in the frame to engage the panels and sub-roof structure.

Figure 8:
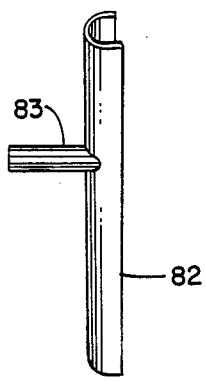
FIG. 8 is a perspective view of a temporary support used when the machine is to be moved over some distance, to prevent movement of the template with respect to the frame.
Figure 9:
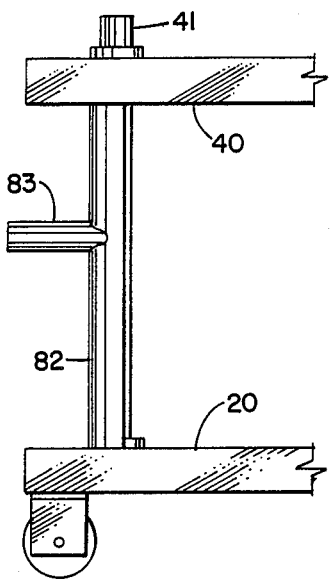
FIG. 9 shows the installation of the support illustrated in FIG. 8.

The downward movement of the template is induced by lowering the handle 75. This handle is pivotally secured to the frame on bolts as shown at 76 and 77 in FIGS. 1 and 2. The arcuate slots 78 and 79 in the opposite sides of the handle receive the pins 80 and 81, respectively, which are in threaded engagement with the edges of the template 40. The downward movement of the handle induces a counter-clockwise rotation of the handle about its pivot axis, as shown in FIG. 1, and this movement is communicated through the pins 80 and 81 to depress the template from the FIG. 1 to the FIG. 2 position. This movement brings the drill bits down through the central opening 21 in the frame to engage the insulation panels and the roof structure. The strength of the balance springs 51 shown in FIG. 10 should be selected so that there will be a natural tendency for the handle 75 to return to the elevated position. Whenever it may be desired to transport the machine without having the template bouncing up and down as the machine is moved over rough surfaces, the arrangements shown in FIGS. 8 and 9 can be used. The auxiliary support member 82 is semi-cylindrical in configuration, and has a laterally-extending handle 83. The unit can be placed so that the portion 82 partially embraces one of the guideposts when the template is in an extreme elevated position, as shown in FIG. 9.

A machine constructed as described above can be very light in weight, particularly when the frame and template are of aluminum. The template weight can be further reduced by the cut-out areas 84-93 shown in FIG. 4. Mechanizing the drilling operation with a machine that is easily handled under construction conditions without damage to the vulnerable insulation will save the cost of the machine in short order.

I claim:

1. A machine for drilling a pattern of holes in a substantially horizontal panel, including a template having openings, and a plurality of drilling devices mounted on said template at said openings, and having drilling axes traversing said template, wherein the improvement comprises:

means forming a frame establishing a platform and having an opening;
   guideway means disposed perpendicularly to said platform on one of said frame and said template, and guideway follower means on the other thereof;
   actuating means operative to position said template along said guideway means, and thereby cause portions of said drilling devices to move through said frame opening into said panel; and
   panel-engaging means adapted to support said frame on said panel, said panel-engaging means including a plurality of rollers each having an axial length exceeding the diameter thereof, said drilling devices being pistol drill units, and said template including clamping means securing said drill units in position at said openings in said template.

2. A machine as defined in claim 1, wherein said frame is a rectangular plate providing a central opening traversed by said drilling devices.

3. A method of drilling a pattern of holes in a substantially horizontal panel of relatively soft material, comprising:

mounting a plurality of self-powered drilling devices on a template in a predetermined pattern, with the drilling axes of said devices normal to said template, and supporting said template on a frame for relative reciprocating movement with respect thereto, said frame defining a central opening;
   positioning said frame on said panel, and lowering said template, including said drilling devices, so that said drilling devices move through said opening in said frame to engage said devices with said panel;
   elevating said template to disengage said drilling devices therefrom; and
   moving said frame and template over said panel to a succeeding position, and repeating the lowering of said template, said template being moved on rollers resting on said panel, said rollers being proportioned to have axial lengths exceeding the diameters thereof to substantially eliminate permanent deformation of said panel during said moving to a succeeding position.

* * * * *